March 6, 1962  R. E. SAND  3,024,346
OVEN HEATING UNIT SUPPORT
Filed Dec. 27, 1960  2 Sheets-Sheet 1
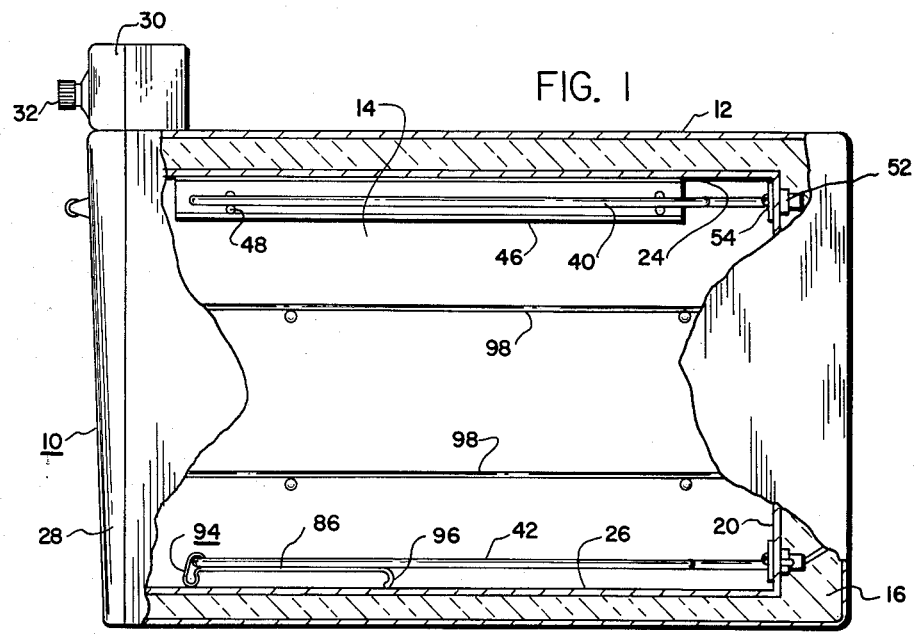
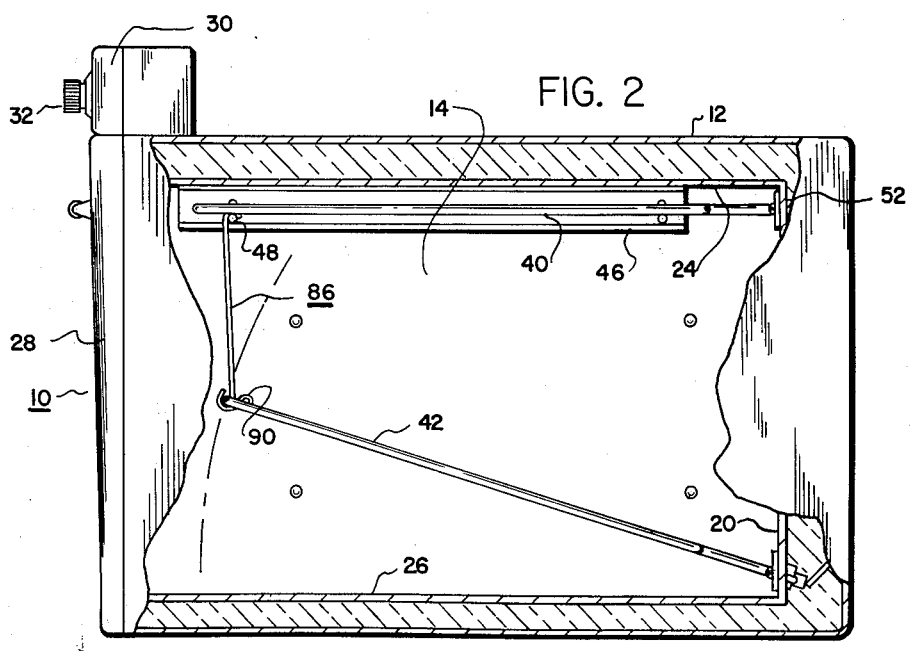
INVENTOR.
ROBERT E. SAND
BY
ATTORNEY March 6, 1962  R. E. SAND  3,024,346
OVEN HEATING UNIT SUPPORT
Filed Dec. 27, 1960  2 Sheets-Sheet 2

INVENTOR.
ROBERT E. SAND
BY
Andrew L. Hubbard
ATTORNEY

United States Patent Office 3,024,346
Patented Mar. 6, 1962

3,024,346
OVEN HEATING UNIT SUPPORT
Robert E. Sand, Itasca, Ill., assignor to General Electric Company, a corporation of New York
Filed Dec. 27, 1960, Ser. No. 78,642
6 Claims. (Cl. 219—37)

The present invention relates to an assembly unit for installation in the oven of an electrical range including a heating element and to means for supporting the heating element in either of two positions in spaced relation to the bottom wall of the oven. It also relates to an improved support for the front end portion of the heating element while in its normal position and which allows the element to be held in a tilted position.

In electrical ranges and particularly in the ovens thereof, one heating element is disposed to occupy a position adjacent the floor of the oven. To facilitate cleaning, particularly of the oven floor, it is the practice either to provide for the total removal of the heating element from the oven, or to provide for hinging the heating unit to permit it to be swung upwardly to provide access to the oven bottom. The first practice calls for a relatively costly terminal structure and possible damage to the oven heating unit during the removal and installation thereof. The alternate construction requires a hinge construction having a detent to maintain the heating unit in its raised position. Because of the high temperatures to which the heating element and its hinge are subjected, the tension of the detent spring, or the like, may deteriorate to the extent that it is not sufficient to maintain the heating element in a raised position during the cleaning operation.

It is therefore an object of the present invention to provide an improved assembly unit for installation in the oven of an electrical range including a heating element and supporting means therefor; and in which the heating element is normally maintained in a predetermined spaced relation to the bottom wall of the oven to insure proper heat distribution within the oven, and in which the element may be tilted and supported in the tilted position to allow cleaning of the oven bottom wall.

It is a further object of the invention to provide a support for an oven heating unit which includes a hook portion which optionally provides a support for the unit and which maintains the unit in its normal operating position, and allows the heating unit to be hung up in a tilted position oblique to the oven floor.

To provide these objects the present invention utilizes a wire frame support member in generally U-shaped configuration. The tips of the U include members designed to fit about a frame structure of the heating unit, or, for example, the sheath of a heating unit of the tubular sheathed type. The apex of the U includes a multi-planar hook adapted to rest on the oven floor maintaining the heating unit in a horizontal plane spaced above the oven floor. The heating unit is hinged to allow upward movement whereupon the hook of the support may engage with a cooperating structure above the unit to suspend the forward end of the heating unit from this cooperating structure. The cooperating supporting structure optimally may be the support for an upper oven heating element. By this suspension the oven floor is cleared of the heating unit and the floor may readily be cleaned in an unimpeded fashion.

The invention both as to its organization and principle together with further objects and advantages thereof will best be understood by reference to the following specification taken in connection with the accompanying drawings in which:

FIG. 1 is a side elevational view of an oven partially sectioned to show the heating units in the oven compartment in the normal position;

FIG. 2 is a view as FIG. 1 with the bottom (or bake) heating element in the tilt-up position;

Figure 3:
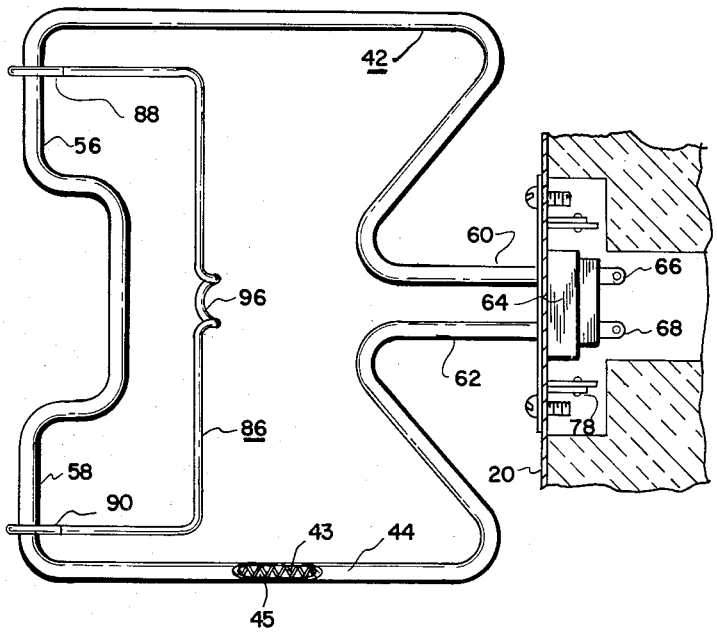
FIG. 3 is a top plan view of a heating unit and support structure showing the heating unit terminal and hinge members at the rear wall of an oven; a small section of the sheath of the unit has been removed to show the resistance element.

Referring now to the drawings, FIG. 1 and FIG. 2 show an oven 10 embodying my invention. The oven includes an outer appearance casing 12, and an inner oven compartment 14 spaced within the outer casing; the air space between is filled suitably with any suitable type of heat insulating material 16. The inner compartment encloses a rectangular polyhedron cavity defined by the joined sheet metal compartment walls which include a rear wall 20, side walls 22, a top wall 24 and a bottom wall or oven floor 26. The front of the oven includes a rectangular access opening which is normally covered by bottom hinged door 28. The door includes an inner sheet metal lining and an outer appearance panel spaced from the inner lining by a suitable air space which may be filled with heat insulating material. The door may be opened from the position of FIGS. 1 and 2 to an open position in which the door extends horizontally in front of the oven to form a landing space for articles being placed into or removed from the oven. The door may optimally be of the type shown in numerous recent patents which allows ready removal of the door to facilitate cleaning of the oven compartment walls.

Secured to the oven casing so that it is accessible from the front is a control panel 30 including within the panel suitable electrical controls for the operation of the oven. Extending forwardly of this panel are suitable manually manipulatable knobs such as 32 for setting the oven operating temperatures and the like.

Disposed within the oven cavity are the oven heating units which include an upper heating element 40 and a lower heating element 42. Although the invention is not limited thereto, both heating units are illustratively of the well known sheath type, each of which comprises a helical resistance conductor 43 housed in a rigid metallic sheath 44 and insulated from the sheath by a highly compacted mass 45 of suitable heat conducting and electrically insulating material such as powdered magnesium oxide. The rigid sheath 44 forms a main supporting structure for the resistance element. Each heating unit is configurated into a suitable shape for effective heat transfer and each has terminals extending from the sheath for energizing the resistance conductor. The terminals of each unit may be of the type which are connected to a current source within a suitable refractory terminal block.

Figure 4:
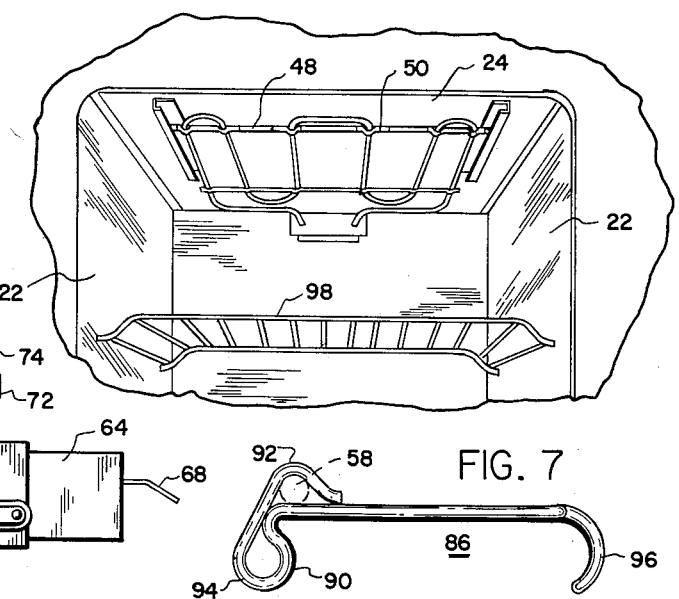
FIG. 4 is a partial front perspective view into the oven cavity viewed through the open door.

Referring now more particularly to the upper heating unit 40 which can best be seen in FIG. 4, the sheath is configurated into a sinuous pattern and is maintained in place within the slide guides 46 by the cross brace member 48 and suitable clips 50. Cross brace 48 extends transversely across the front end heating unit to hold the heating unit against its tendency to sag when heated. The clips 50 may be of any generally known type which include a nest for the sheath and a straight length for affixing the clip to the cross brace. It should be noted that brace 48 extends continuously across the front of heating unit 40 and is spaced away from the top wall 24 of the oven cavity. Affixed to the rear wall, there is provided a terminal block 52 which accommodates the terminal ends 54 of heating unit 40 for connection of the conductors to a suitable current source. From the rear of the terminal block, suitable conductors may be extended to the current source.

The lower heating unit 42 may take the configuration shown in FIG. 3 or any other configuration suitable for providing efficient and substantially uniform heat to the oven cavity. With any of these configurations there would be provided a straight run portion extending parallel to the front wall of the oven and adjacent thereto. In the configuration of FIG. 3 this straight run includes a discontinuous run adjacent the oven front including partial front runs 56 and 58. This heating unit includes a continuous sheath ending at terminal ends 60 and 62 which extend through rear wall 20 into terminal block 64. This terminal block is made of suitable refractory material and may be affixed rearwardly of wall 20 within the space afforded by the outer cabinet spacing. Extending rearwardly of the terminal block are connectors 66 and 68 which are joined individually to the conductors within terminal ends 60 and 62 respectively. These connectors are used to connect the heating unit conductors to a connection to a suitable voltage source.

Figure 5:
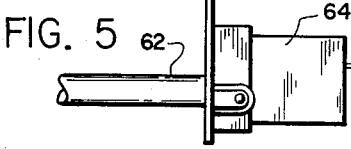
FIG. 5 is a partial side view of a hinged terminal block and terminals in the normal position.
Figure 6:
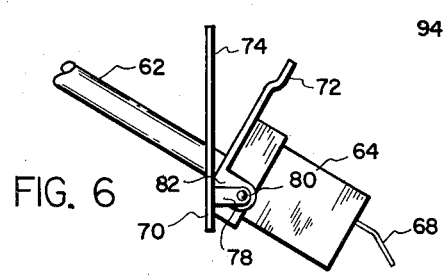
FIG. 6 is a view as FIG. 5 showing the terminal block and terminals in the tilt-up position.

The terminal block 64, as can be seen in FIGS. 5 and 6, is hingedly affixed to rear wall 20 by means of any suitable hinging mechanism 70 which allows movement of the block from a normal position in which the terminal block front and the cover plate are in contact parallel to the oven rear wall, to an off-normal position in which the cover plate 72 forms an acute angle with the oven rear wall 20. The hinge mechanism, shown exemplarily herein, includes a mounting plate 74 which is adapted to be fastened to the rear wall 20 of the oven by suitable screws 76. Integral to this plate and extending rearwardly therefrom are spaced hinge legs 78. Through legs 78 are formed circular openings in which individual hinge pins 80 may be impressed. Hinge pins 80 each extend through a similar hole in identical legs 82 integral to and extending rearwardly from cover plate 72. By this construction the legs 82 may be rotated with respect to legs 78 for movement of the cover plate with respect to the mounting plate. Terminal block 64, as shown, is secured in such a manner that it is co-rotative with cover plate 72.

Figure 7:
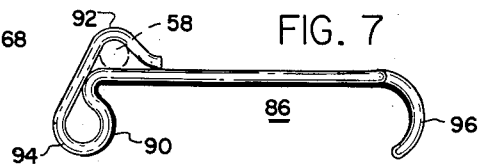
FIG. 7 is a side elevational view of a support structure according to my invention.

Turning now to FIGS. 3 and 7, there is shown in detail the mounting and spacing support which includes a substantially U shaped frame structure disposed in a horizontal plane. At the tips of the U there are formed substantially in the shape of a figure "6" the respective engaging legs 88 and 90 normal to the plane of the frame structure in general and adapted to fit about straight run sheath sections 56 and 58 respectively. These engaging legs such as 90 shown in FIG. 7 include at the upper end a hook 92 shaped to fit closely about the sheath and at the lower end are shaped to provide a spacer section 94 which seats on the oven floor and maintains the heating element a spaced distance therefrom. It should be noted that the close fit of the hook end 92 must not impair the rotatability of the support about the sheath engaged therein. The apex of the U includes a recurved portion 96 adapted to rest on the oven floor and maintain the support frame 86 in its normal position. By the use of this construction, a tripod is formed by depending spacer legs 94 at each end of the U frame and by the depending recurved section 96. The U frame 86 optimally may be configured from a length of rigid steel wire, tubing, strip or the like. The showing herein has been of the rod or wire form which preferably would be stainless steel.

To complete the description, in FIGS. 1 and 4 there are shown one or more wire racks 98 adapted to rest on a horizontal plane midway up the oven sidewalls for holding pans and the like a distance from the heat sources. These racks are readily removable as generally known and should be removed when the oven is to be cleaned.

The functioning of the invention is as follows: When the oven is to be used, the lower heating unit is placed in its horizontal position resting on its support frame 86 in the manner shown in FIG. 1. The hinge remains in the position of FIG. 5 and the heating unit is firmly supported in spaced relation to the oven floor.

When it is desired to clean the oven interior, racks 98 are removed from the oven to clear the oven interior. Support 86 is rotated upwardly to a vertical position and raised. This rotating and raising of the support rotates the heating unit about hinge pins 80 at hinge mechanism 70 in the manner shown in FIG. 6. The recurved section 96 of the support is then hooked across cross brace 48 as shown in FIG. 2 and the floor of the oven is thereby cleared to facilitate cleaning the oven floor. When the cleaning is completed, recurved section 96 is freed of cross brace 48 and returned to its normal position on oven floor 26 supporting the heating unit on its tripod legs.

While there has been described what is at present considered to be the preferred embodiment of the invention it will be understood that it is intended to cover in the appended claims all such improvements and modifications which fall within the true spirit and scope of the invention.

What is claimed is:

1. In an electric oven structure including walls defining a hollow rectangular oven compartment provided with an access opening in the front wall; an electric heating unit in said oven compartment comprising a heater shaped in the form of a flat continuous loop extending partially adjacent the front wall of said compartment with terminal legs extending from the loop toward said rear wall, means secured to said terminal legs for affixing said heating unit to said rear wall for movement from a normal position parallel to the bottom wall of said compartment to a tilted position oblique to said bottom wall, support means for said unit, said support means including a substantially U shaped body mounted to the front of said loop, said body including a base section for engaging the bottom wall of said compartment for resting said heating unit on said bottom wall in the normal position, means extending below the top wall of said compartment, the base section of said heating unit support means rotative relative to said heating unit loop to extend vertically from said loop, and means at said base section engaging said depending means to support said heating unit therefrom with said heating unit in the tilted position.

2. In an electric oven structure including walls defining a hollow rectangular oven compartment provided with an access opening in the front wall and also provided with electrical connecting means at the rear wall; an electric heating unit in said oven compartment comprising an elongated, sheathed resistance heater, said heating unit shaped in the form of a flat continuous loop extending partially adjacent the front wall of said compartment with terminal legs extending from the loop toward said rear wall for engagement with said connecting means, means secured to said terminal legs for affixing said heating unit to said rear wall for movement from a normal position parallel to the bottom wall of said compartment to a tilted position oblique to said bottom wall, support means for said unit, said support means including a substantially U shaped wire frame mounted to the front of said loop at the free ends of the U frame, the apex of said U frame including a base section for engaging the bottom wall of said compartment for resting said heating unit on said bottom wall in the normal position, means extending horizontally below the top wall of said compartment, the apex end of said heating unit support means rotative relative to said heating unit loop to extend vertically above said loop whereby said base section may engage said depending means to support said heating unit therefrom with said heating unit in the tilted position.

3. In an electric oven structure including walls defining a hollow rectangular oven compartment provided with an access opening in the front wall and also provided with electrical connecting means at the rear wall; an electric heating unit in said oven compartment comprising an elongated, sheathed resistance heater, said heating unit shaped in the form of a flat continuous loop extending partially adjacent the front wall of said compartment with terminal legs extending from the loop toward said rear wall for engagement with said connecting means, means secured to said terminal legs for affixing said heating unit to said rear wall for movement from a normal position parallel to the bottom wall of said compartment to a tilted position oblique to said bottom wall, support means for said unit, said support means including a substantially U shaped wire frame fitted about the sheath at the front of said loop with the tips of the U frame engaging said sheath, the apex of said U frame including a recurved section adapted to engage the bottom wall of said compartment for resting said heating unit on said bottom wall in the normal position, means extending horizontally below the top wall of said compartment, the apex end of said heating unit support means rotative relative to said heating unit loop to extend vertically from said loop whereby said recurved section may engage said depending means and support said heating unit therefrom with said heating unit in the tilted position.

4. In an electric oven structure including walls defining a hollow rectangular oven compartment provided with an access opening in the front wall and also provided with electrical connecting means at the rear wall; a first electric heating unit in said oven compartment comprising an elongated, sheathed resistance heater, said heating unit shaped in the form of a flat continuous loop extending partially adjacent the front wall of said compartment with terminal legs extending from the loop toward said rear wall for engagement with said connecting means, means secured to said terminal legs for affixing said heating unit to said rear wall at a level adjacent said bottom wall and allowing movement from a normal position parallel to the bottom wall of said compartment to a raised position oblique to said bottom wall, support means for said unit, said support means including a substantially U shaped wire frame including looped portions at the tips of the U, said looped portions fitted about the front extent of said sheath loop, the apex of said U including a recurved base section for resting said heating unit on said bottom wall in the normal position, a second heating unit parallel to and adjacent the top wall of said compartment, means for maintaining said second unit in position below the top wall of said compartment, the apex end of said first heating unit support means rotative relative to said first heating unit loop to extend vertically above said loop to engage said second unit maintaining means and support said first heating unit from said second unit maintaining means with said first heating unit in the raised position.

5. In an oven structure including front, rear, side, top and bottom walls defining a hollow oven cavity, an electric heating element comprising a resistance heater disposed in a horizontal plane adjacent the bottom wall of said cavity, said heating element including a section extending adjacent the front thereof, means for hinging said heating element for movement from said horizontal plane to a position oblique to said bottom wall, and support means for holding said element in said horizontal plane spaced away from said bottom wall, said support means including a tripod member with legs normally resting on said bottom wall, said support means including means for engaging said heater allowing elevation of said heater concurrently with said support means, said support means rotatable about the front section of said heating element, and means traversing said oven cavity adjacent the top thereof for intercepting and holding one of said tripod legs on elevation thereof for retaining said heating element in a position oblique to said bottom wall.

6. In an oven structure including front, rear, side, top and bottom walls defining a hollow oven cavity, an electric heating element comprising a resistance heater, a rigid metallic structure insulated from said heater and providing a supporting structure therefor, said heating element being disposed in a horizontal plane adjacent the bottom wall of said cavity, said heating element including a section extending adjacent the front wall of said oven, means for hinging said heating element for movement from said horizontal position to a position oblique to said bottom wall, and support means for holding said element spaced away from said bottom wall when in said horizontal position, said support means including a tripod support member with legs normally resting on said bottom wall, said support means including means encircling said sheathed heater and allowing elevation of said heater concurrently on elevation of said support means, said support means rotatable about the axis formed by the section of said heating element adjacent the front wall, and means traversing said oven cavity adjacent the top thereof for intercepting and holding one of said tripod legs for retaining said heating element in a position oblique to said bottom wall.

References Cited in the file of this patent
UNITED STATES PATENTS 2,844,703    Prather ---------------- July 22, 1958
2,922,017    Ripley ---------------- Jan. 19, 1960